United States Patent [19]

Barendregt et al.

[11] 4,293,873
[45] Oct. 6, 1981

[54] METHOD AND A DEVICE FOR PRODUCING SEPARATION IMAGES HAVING THE EFFECT OF BEING ORTHOGONALLY SCREENED

[75] Inventors: Frank Barendregt; Leendert A. Boogaard, both of Boxmeer, Netherlands

[73] Assignee: Stork Brabant B.V., Boxmeer, Netherlands

[21] Appl. No.: 79,799

[22] Filed: Sep. 28, 1979

[30] Foreign Application Priority Data

Oct. 4, 1978 [NL] Netherlands ......................... 7810032

[51] Int. Cl.³ ............................................... H04N 1/46
[52] U.S. Cl. ........................................ 358/75; 358/78
[58] Field of Search ............... 358/75, 80, 289, 76–79, 358/283

[56] References Cited

U.S. PATENT DOCUMENTS

3,770,888  11/1973  de Vos et al. ......................... 358/283
3,911,480  10/1975  Brucker ................................. 358/75

*Primary Examiner*—John C. Martin
*Attorney, Agent, or Firm*—Silverman, Cass & Singer, Ltd.

[57] ABSTRACT

A method and a device for producing separation images which are essentially orthogonally screened for reproducing an original multicolor image. In one embodiment, the original image is mounted on a drum which is rotated in a Y direction. A sensor is moved in an X direction, essentially orthogonal to the Y direction, axially of the drum adjacent the drum's surface, and senses the several colors of the original image on a point by point basis. The distances in the X and Y directions between the scanned points on the original image are changed for each separation image according to trigonometric relationships. Thus, separation images are produced which have equal screen ruling and different screen angles relative to a Y direction. The method and apparatus produce signals which are applied to some form of device or devices which actually generate the separations for use in multicolor printing or the like.

8 Claims, 5 Drawing Figures

METHOD AND A DEVICE FOR PRODUCING SEPARATION IMAGES HAVING THE EFFECT OF BEING ORTHOGONALLY SCREENED

BACKGROUND OF THE INVENTION

The invention concerns a method of producing color separation images which are essentially orthogonally screened, one for each primary or basic color, suitable for reproduction of an original image, from an original image having at least two primary colors. The separation images so produced appear to have equal screen rulings and each separation image is rotated a certain angle relative to the Y direction. These separation images may be in the form of film negatives or printing plates.

In the art of color reproduction such as by printing, it is common practice to prevent the occurrence of Moire effects in the finished product by using different screen angles relative to a reference direction or pattern for the color separation images produced from an original image, screen ruling of the separation images being equal. The colors used for the separation images generally are yellow, magenta, cyan and black. The different angles with the reference direction or pattern are formed by lines connecting the dots in the several separation images.

It is also known in producing such separation images to scan the original image optically with a constant screen ruling for every primary color and to convert the light intensity of every scanned point on an electric signal which is a function of the color intensity of the scanned point. The electric signal may then be used for directing equipment to produce the respective screened separation images.

Rotation of the separation images to form the different angles may be obtained by rotating the original image to the desired angle for each color or by choosing a different scanning direction for each color. Both methods are complicated.

SUMMARY OF THE INVENTION

In accordance with the invention, the original image is scanned point by point by an optical sensor once for each separation image to be produced. One separation image is produced for each desired color. Scanning of the original image for all of the separation images is performed by moving a scanning head in two essentially orthogonal directions relative to the original image, with a separate scanning pattern being performed for each separation image. The separate scanning patterns are obtained by altering the distances between scanned points the scanning head travels in each direction according to trigonometric relationships. The information concerning color density at each scanned point then is associated with information concerning the respective distances the scanning head has traveled in both of the two directions. This associated information then is used to control and operate a device producing separation images to form on each separation image information related to the sensed color density of the original image at respective locations corresponding to the locations at which the color density information was sensed on the original image. The separation images produced in this way are effectively orthogonally screened, have equal screen ruling and are rotated over screen angles relative to a reference direction, all according to the trigonometric relationships.

DESCRIPTION OF THE PREFERRED EMBODIMENT

The invention provides a method for producing orthogonally screened separation images whose screen angles are rotated relative to a reference direction over any arbitrary but previously chosen angle $\alpha$ between 0 degrees and 90 degrees, 0 degrees and 90 degrees included, as described hereinabove, and wherein it is not necessary to change either the orientation of the original image or the scanning direction to produce a screen rotation.

The method according to the invention is performed by optically scanning the original image, point by point, once for each color separation image to be produced, in two essentially perpendicular directions starting from an origin which is formed by the intersection of the X-axis and Y-axis. The first direction or Y-axis is essentially perpendicular to a base line, with a first distance, $l_1$, between scanned points on lines running in the first direction. The second direction or X-axis is essentially parallel to the base line with a second distance, $l_2$, between the lines running in the first direction. The distance $l_1$ and $l_2$ governed by the tangent of the previously chosen angle ($\alpha$) are in principle different for each separation image to be produced. The original image to be reproduced may be mounted around the circumference of a rotatable cylinder. The cylinder is rotated about its longitudinal axis and a scanning head is moved adjacent the original image parallel to the cylinder axis.

Scanning of the original image begins at the origin with rotation of the cylinder being in the first direction and movement of the scanning head being in the second direction. After the first revolution of the cylinder, the next point past the base line to be scanned is situated on a line running in the first direction, which line is a distance $l_2$ to the right of the origin and which point is at a distance $l_3$ from the base line. Scanning points after the first scanning point on any scanning line running in the first direction have equal distances $l_1$ between them. Simple trigoniometric relationships exist between $\alpha$, $l_1$, $l_2$, $l_3$ and the screen ruling or the spacing (a) of the separation images. The trigonometric relationships between $\alpha$, $l_1$, $l_2$, $l_3$ and a are:

A. $\tan\alpha = u/v$
with the conditions:
$0 \leq \alpha \leq 90°$
$u \geq 0$ and integer
$v \geq 0$ and integer
$|u - v|$ is $\underline{\text{minimum}}$ B. $l_1 = a\sqrt{u^2 + v^2}$ C. $l_2 =$ $$\frac{a}{\sqrt{u^2+v^2}}$$

D.

$$l_3 = \beta l_1 \quad (1)$$

with $$\beta = \{m - \text{integer}(m)\} \quad (2)$$

and $$m = np/(u^2+v^2) \quad (3)$$

and $$p = su + tv \quad (4)$$

and $$t = (sv+1)/u \quad (5)$$

with the conditions:
 $p \geq 0$ and integer
 $s \geq 0$ and integer
 $t \geq 0$ and integer
 $|s-t|$ is minimum
 $0 \leq n \leq u^2 + v^2$ and integer Starting with equation (5) t is determined by taking s=0, 1, 2, 3, . . . considering the conditions. Scanning starts in the origin (O) along a line in the first direction, of which line the order of scanning n equals zero, which line is identical with the Y-axis and the pattern is repeated when the order of scanning n equals $u^2+v^2$, since from equation (3) it appears that $$l_3(n=0) = l_3(n = u^2 + v^2) = 0$$

These trigonometric relationships are valid for every angle $\alpha$ between 0 degrees and 90 degrees, 0 degrees and 90 degrees included, of which the tangent can be written as u/v.

The signals which are obtained from the scanning and which represent the respective color densities in the scanned points, are used to control a device for producing the screened separation images which are suitable for reproduction of the original image in the color concerned.

When acting according to the described method, effective orthogonally screened separation images are obtained which have evenly spaced screened dots with equal spacing (a), and in which the lines connecting the dots in the respective screens form the different angles with the Y-axis. In this way, the intended effect—screen rotation—is obtained. Obviously, no actual screens are used in the process.

As described hereinabove, the method may be performed with the original image to be produced mounted on a rotatable cylinder and a scanning head moving parallel to the central axis of the cylinder.

The scanning head may be stepped parallel to the cylinder along the base line a distance $l_2$ to the right after one revolution of the cylinder. The distance between the scanning points on lines perpendicular to the base line is the first distance $l_1$. The distance $l_3$ between the base line and the first point scanned after one revolution of the cylinder is smaller than the first distance $l_1$.

Alternatively, the scanning head may be synchronously driven with the cylinder rotation so that after each complete revolution of the cylinder, the scanning head is moved axially the second distance $l_2$ so that the scanning head describes a helix over the surface of the original image.

In color printing, there are standard screen rotations for the several basic colors. In a typical combination the screen of the color yellow is not rotated with respect to the Y-axis, whereas the separation images for the colors magenta, cyan and black are rotated approximately 15,75 and 45 degrees respectively to the right of the Y-axis.

The value of the tangent of $\alpha$ is chosen, to obtain screen rotations comparable to the standard rotations and with an equal spacing (a) for the produced separation images, as follows:

For Yellow:

$\tan\alpha_y = 0 \quad (\alpha = 0 \text{ degrees})$
$l_{1y} = a$
$l_{2y} = a$
$l_{3y}(n) = 0 \times l_{1y} = 0$ For magenta:

$\tan\alpha_m = \frac{1}{4} \quad (\alpha \text{ is approximately 15 degrees})$
$l_{1m} = a\sqrt{17}$
$l_{2m} = \frac{1}{17} a\sqrt{17}$
$l_{3m}(n) = \left\{ \frac{4}{17} n - \text{integer}\left(\frac{4}{17} n\right) \right\} \times l_{1m}$ For cyan:

$\tan\alpha_c = 4 \quad (\alpha \text{ is approximately 75 degrees})$
$l_{1c} = a\sqrt{17}$
$l_{2c} = \frac{1}{17} a\sqrt{17}$
$l_{3c}(n) = \left\{ \frac{13}{17} n - \text{integer}\left(\frac{13}{17} n\right) \right\} \times l_{1c}$ For black:

$\tan\alpha_b = 1 \quad (\alpha \text{ is approximately 75 degrees})$
$l_{1b} = a\sqrt{2}$
$l_{2b} = \frac{1}{2} a\sqrt{2}$
$l_{3b}(n) = \left\{ \frac{n}{2} - \text{integer}\left(\frac{n}{2}\right) \right\} \times l_{1b}$ It is known that the signals obtained from the scanning head or device may be used to direct the action of another device which operates in a pattern corresponding to the scanning pattern to form the separation image. This device may be an intensity modulated source of electromagnetic radiation which exposes a charged photoconductive surface as is well known as xerography, but the device may also be a source of radiation or a radiation device with which surface parts may be selectively removed or applied.

The claimed invention also includes a device for performing the hereinbefore described method. Such a device comprises a carrier on which the original image to be reproduced is mounted, and a color selective optical scanning device which moves relative to the carrier and which produces electrical output signals which are a function of the scanned color density of the original image. Driving means including steering devices provide for movement of the carrier and scanning device relative to each other in two essentially perpendicular directions. The original image is scanned optically, once for each color, starting from an origin. Scanning is performed along a line in a first direction or Y-axis perpendicular to a base line, the base line coinciding with the X-axis, with a first distance $l_1$ between scanned points lying on lines running in the first direction and with a second distance $l_2$ between successive lines running in the first direction. For the respective color separation images, first distance $l_1$ and/or the second distance $l_2$ generally differ from each other and are related to the spacing (a) according the formula:

$$l_1 \times l_2 = a^2.$$

Starting from the last scanning point on a line before the base line, the next scanning point on the next neighboring line is situated such that the distance $l_3$ from the next scanning point to the base line is smaller than the first distance $l_1$. The signals obtained from scanning represent the respective color densities of the scanned points and are fed as control signals to a device capable of producing screened separation images in the desired colors, which images are suitable for a production of the original image in the considered colors.

Such a described device may consist of a known installation which is used for scanning original images to produce suitable screened separation images, which installation is directed by a predetermined program in accordance with the invention herein.

Figure 1:
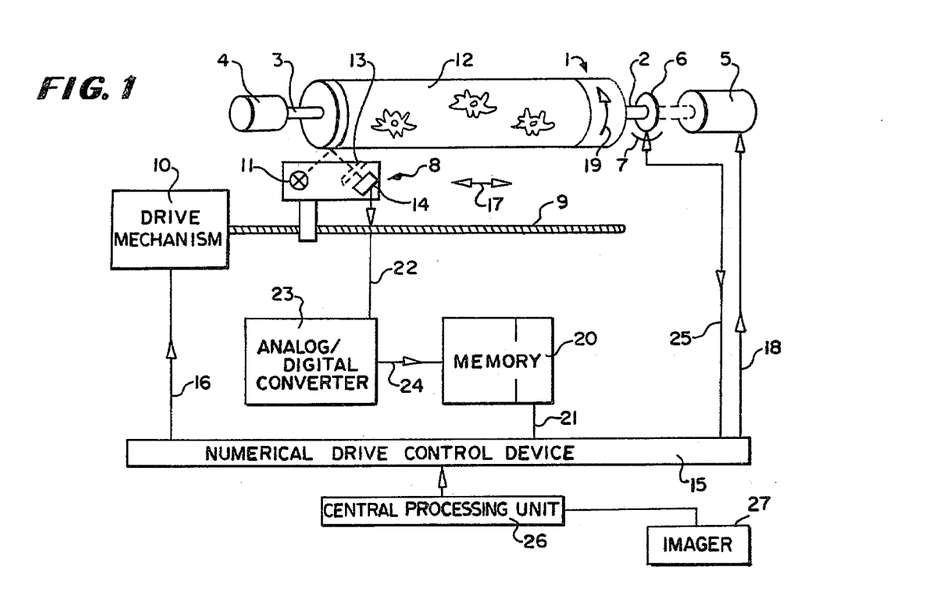
FIG. 1 is a block and schematic diagram which illustrates a device for effecting the method of the invention.

FIG. 1 schematically shows a device with which the method of the invention may be executed.

This installation consists of a drum 1 which may be rotated on its axles 2 and 3 which are supported respectively on a bearing 4 and on the bearings of a stepping motor 5. A position indicator disc 6 is mounted on axle 2 and cooperates with a detector 7, such as an optical detector, which is mounted adjacent disc 6 and which senses marks applied on the disc. Disc 6 and detector 7 cooperate to provide information concerning the angular position of the axle and the drum. An optical scanner 8 is mounted for movement parallel to the drum axis and is driven by a spindle 9 which in turn is driven by a drive mechanism 10. The optical scanner 8 comprises a light source 11 from which collimated light is directed onto the surface of an original image 12 which is mounted on drum 1 and which is to be scanned. The light from source 11 which is reflected from the original image 12 passes through a color filter 13 to a photoelectric detector 14 which produces electric signals which are representative of the color density in a scanned point of the original image. Such devices are known in the art.

Signals produced by the photoelectric detector 14 may be used for example, for the control of a tool. For instance, a cutting tool may be controlled to act on the surface of a printing drum on which the printing screen is to be formed and where the extent of machining of the surface such as the depth of the cutting of the surface for each basic color is governed by the detector output signals. According to the invention, scanning of the original image 12 is performed in a well defined pattern.

Scanning is governed by a numerical drive control device 15 which controls movement of optical scanner 8 in a direction parallel to the axis of cylinder 1, as shown by double arrow 17, through drive mechanism 10 via line 16. Control device 15 also controls the stepped angular rotation of drum 1 in the direction of arrow 19 through drive mechanism 5 via line 18. Information concerning the position of the optical scanner 8 and angular position of drum 1 is fed by control device 15 to the memory unit 20 via line 21.

The output signal of detector 14 is fed to analog/digital converter 23 via line 22 and converted digital information representing the color density in a scanned point is fed to memory 20 via line 24. The digital color density information is combined in memory 20 with information concerning the axial position of optical scanner 8 and with information concerning the angular position of drum 1, the angular position information being obtained from detector 7 via line 25.

The information which is stored in memory 20 in this manner may be recalled at any desired moment and may be used for controlling a printing plate surface machining device or imager 27 which is known and which is not shown here. The whole assembly is controlled by a central processing unit 26.

A color original image is scanned in steps, point by point, with a photoelectric converter which is equipped with a suitable filter to provide electric signals which are a function of the color intensity in each of the scanned points. The color scanned is governed by the type of filter used and scanning for the different colors is carried out in mutually exclusive patterns.

Figure 2:
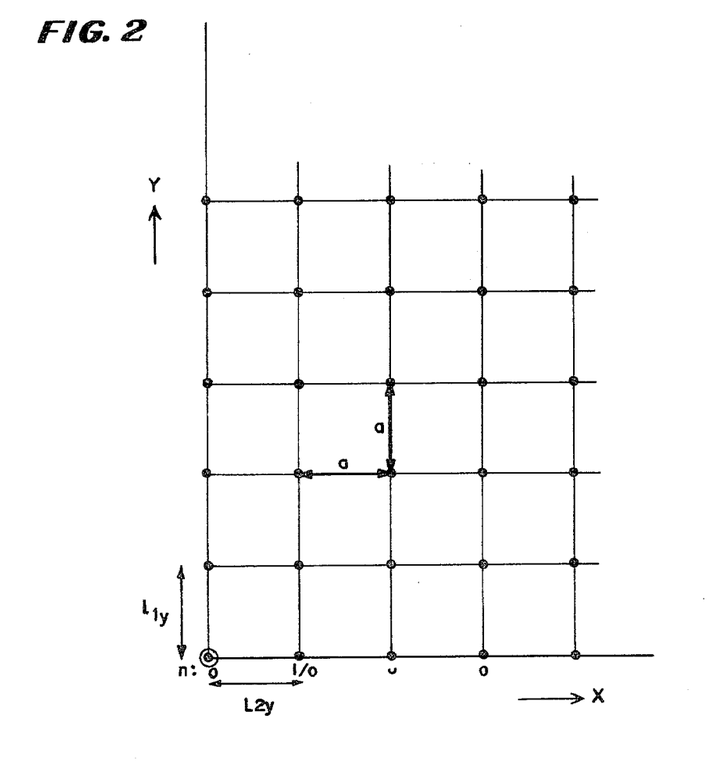
FIG. 2 is a chart or layout illustrating the screen pattern used for printing a yellow separation image.

FIG. 2 shows the pattern in which the original image is scanned for the color yellow. This scanning pattern has two mutually perpendicular scanning directions, the X direction and the Y direction, respectively and scanning begins from an origin, O. The X direction is parallel to the line which was previously described as the base line, with the Y direction being perpendicular to the base line; the X-axis being equivalent to the base line. As described hereinabove, the original image may be mounted on a surface of a drum or cylinder which is rotatably driven while the scanning device is moved parallel to the cylinder axis, the drum rotation being in the Y-direction and the scanning device movement being in the X-direction. Point to point scanning is performed in the Y-direction, starting from a base line, with equal distances of $l_{1y}$ between the scanning points, until the base line is reached again. The scanning device then is displaced a certain distance $l_{2y}$ in the X-direction and scanning in the Y-direction is continued.

A. For the color yellow the tangent of the angle $\alpha_y$ is chosen to be zero:

$$\tan \alpha_y = 0,$$

so $$u = 0$$

and $$v = 1$$

B. According to the trigonometric relationship $$l_1 = a\sqrt{u^2 + v^2}$$
$$l_{1y} = a$$

C. According to the trigonometric relationship $$l_2 = \frac{a}{\sqrt{u^2 + v^2}}$$
$$l_{2y} = a$$

D. The condition $0 \leq n \leq u^2 + v^2$ requires that $n=0$ or $n=1$. Accordingly equations (1), (2) and (3) holds for $n=0$, $m=0$ and $\beta=0$ so $l_{3y}(n=0)=0$ and for $n=1$, $m=p$ and $\beta=(p-p)=0$, so $l_{3y}(n=1)=0$. It appears that after one revolution of the cylinder the distance $l_{3m}$ equals zero, so the first scanned point is situated again on the base line and this point may be considered the origin. Scanning is continued for the entire original image following this procedure.

Figure 3:
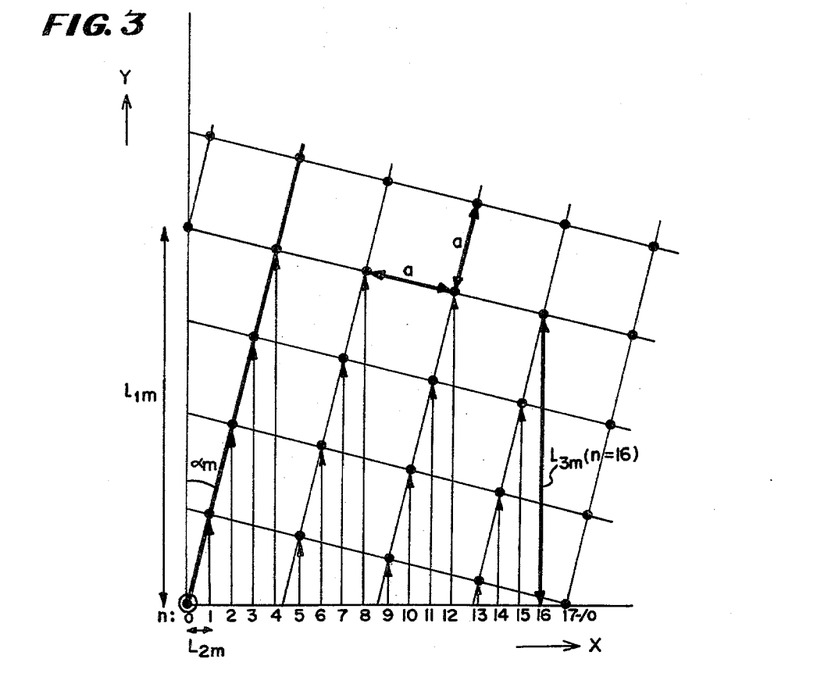
FIG. 3 is the same as FIG. 2 but for printing a magenta separation image.

FIG. 3 shows the pattern in which the original image is scanned for the color magenta.

A. For the color magenta the tangent of the angle $\alpha_m$ is chosen $\frac{1}{4}$:

$$\tan \alpha_m = \tfrac{1}{4},$$

so $$u = 1$$

and $$v = 4$$

B. According to the trigonometrical relationship $$l_1 = a\sqrt{u^2 + v^2}$$
$$l_{1m} = a\sqrt{17}$$

C. According to the trigonometrical relationship $$l_1 = \frac{a}{\sqrt{u^2 + v^2}}$$
$$l_{2m} = \frac{1}{17} a\sqrt{17}$$

D. Accordingly equation (5) holds:

$$t = 4s + 1,$$

so $$s = 0$$

and $$t = 1$$

Accordingly equation (4) holds:

$$p = 4,$$

and accordingly equation (3) holds:

$$m = 4/17 \, n$$

Accordingly equation (2) holds:

$$\beta = \left\{ \frac{4}{17} n \text{-integer}\left( \frac{4}{17} n \right) \right\}.$$

Example: For the scanning line with $n=16$ holds:

$$m = \frac{4 \times 16}{17} \text{ and integer}(m) = 3 \text{ and}$$

$$l_{3m}(n=16) = \left( \frac{4 \times 16}{17} - 3 \right) a\sqrt{17} = \frac{13}{17} a\sqrt{17}$$

It appears that after 17 revolutions of the cylinder $l_{3m}$ equals zero, so the first scanned point is situated again on the base line and this point may be considered the origin. Scanning is continued for the entire original image following this procedure. In this way, an essentially orthogonal screen pattern is obtained in which the spacing, as in the case of the color yellow pattern, equals a, but in which the screen pattern relative to the Y-axis is rotated to the right over an angle $\alpha_m$, equal to approximately 15 degrees, around the origin O.

Figure 4:
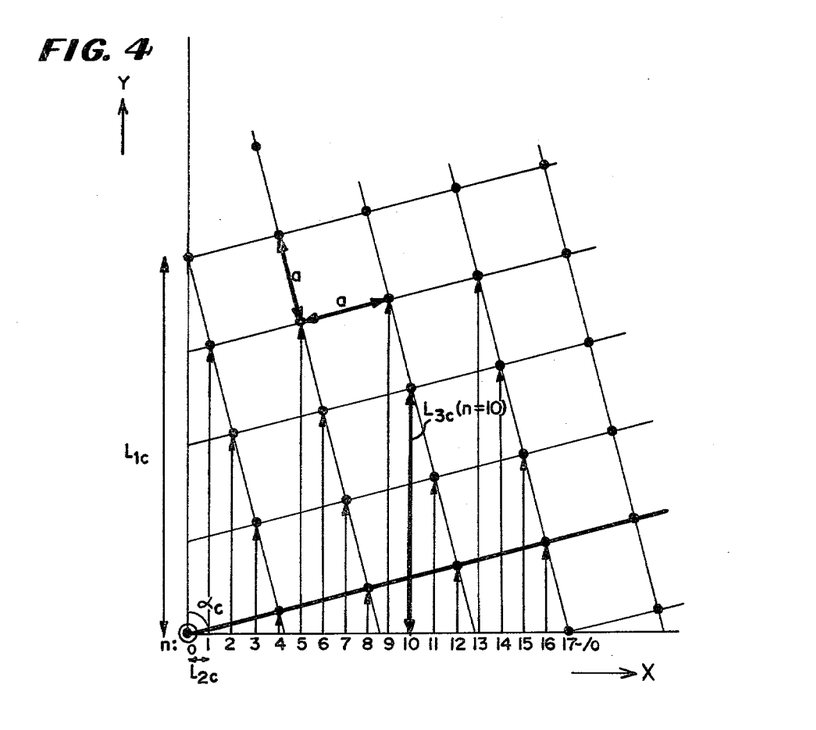
FIG. 4 is the same as FIG. 2 but for printing a cyan separation image.

FIG. 4 shows the pattern in which the original image is scanned for the color cyan.

A. For the color cyan the tangent of the angle $\alpha_c$ is chosen 4:

$$\tan \alpha_c = 4,$$

so $$u = 4$$

and $$v = 1$$

B. According to the trigonometrical relationship $$l_1 = a\sqrt{u^2 + v^2}$$
$$l_{1c} = a\sqrt{17}$$

C. According to the trigonometrical relationship $$l_2 = \frac{a}{\sqrt{u^2 + v^2}}$$
$$l_{2c} = \frac{1}{17} a\sqrt{17}$$

D. Accordingly equation (5) holds:

$$t = (s+1)/4$$

so $$s = 3$$

and $$t = 1$$

Accordingly equation (4) holds:

$$p = 13$$

and accordingly equation (3) holds:

$$m = 13/17 \, n$$

Accordingly equation (2) holds:

$$\beta = \left\{ \frac{13}{17} n\text{-integer}\left(\frac{13}{17} n\right) \right\}.$$

Example: For the scanning line with n=10 holds:

$$m = \frac{10 \times 13}{17} \text{ and integer } (m) = 7 \text{ and}$$

$$l_{3c}(n=10) = \left(\frac{10 \times 13}{17} - 7\right) a \sqrt{17} = \frac{11}{17} a \sqrt{17}$$

It appears that after 17 revolutions of the cylinder $l_{3c}$ equals zero, so the first scanned point is situated again on the base line and this point may be considered the origin. Scanning is continued for the entire original image following this procedure.

In this manner of scanning an essentially orthogonally screened separation image is obtained in which the spacing, as in the case of the separation images for the colors yellow and magenta, is equal to a, but in which the screen pattern relative to the Y-axis is rotated to the right around the origin O, an angle $a_c$ equal to approximately 75 degrees.

Figure 5:
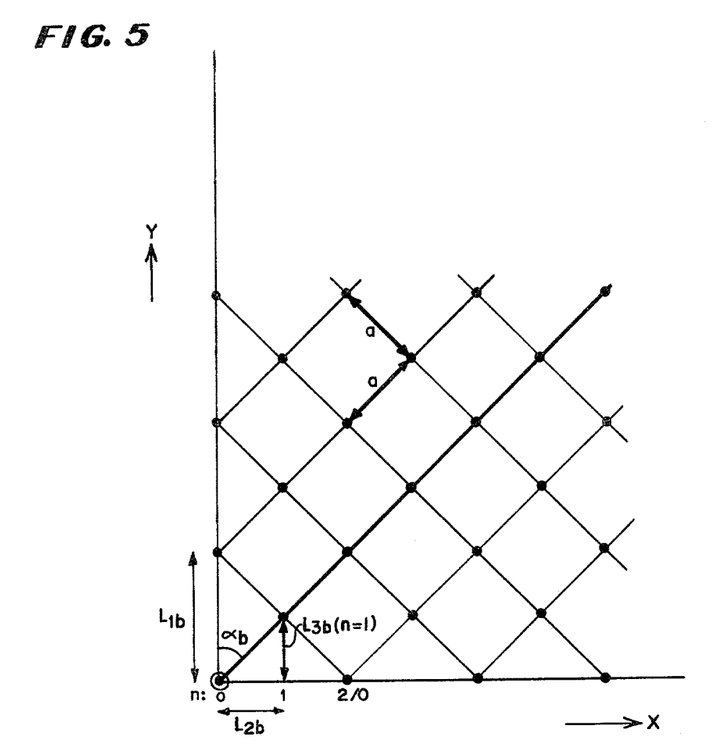
FIG. 5 is the same as FIG. 2 but for printing a black separation image.

The screen pattern for the color black, finally, is formed as shown in FIG. 5.

A. Here the tangent of the angle $a_b$ is chosen 1:

$$\tan a_b = 1,$$

so $$u = 1$$

and $$v = 1$$

B. According to the trigonometrical relationship $$l_1 = a \sqrt{u^2 + v^2}$$

$$l_{1b} = a \sqrt{2}$$

C. According to the trigonometrical relationship $$l_2 = \frac{a}{\sqrt{u^2 + v^2}}$$

$$l_{2b} = \tfrac{1}{2} a \sqrt{2}$$

D. Accordingly equation (5) holds:

$$t = s + 1,$$

so $$s = 0$$

and $$t = 1$$

Accordingly equation (4) holds:

$$p = 1$$

and accordingly equation (3) holds $$m = \tfrac{1}{2} n$$

Accordingly to equation (2) holds $$\beta = \{\tfrac{1}{2} n - integer(\tfrac{1}{2} n)\}$$

For the scanning line with n=1 holds:

$$m = \tfrac{1}{2} \text{ and integer } (m) = 0 \text{ and}$$

$$l_{3b}(n=1) = (\tfrac{1}{2} - 0) a \sqrt{2} = \tfrac{1}{2} a \sqrt{2}$$

It appears that after 2 revolutions of the cylinder $l_{3b}$ equals zero, so the first scanned point is situated again on the base line and this point may be considered the origin. Scanning is continued for the entire original image following this procedure. The resulting screened black separation image has a spacing (a) equal to the spacing of the other colors and is rotated to the right with respect to the Y-axis an angle $a_b$ equal to 45 degrees.

In the foregoing description, it is assumed that the Y-axis is perpendicular to the X-axis.

If the drive mechanism 10 continuously advances the optical scanner 8 instead of stepping optical scanner 8, while the drum is continuously rotated, a helix is described across the surface of the original image. The angle between the X-axis and Y-axis then is not exactly 90 degrees but is a very minute and negligible deviation from this value. To measure this deviation, we may assume the case of a cylinder circumference of 50 centimeters and a spacing of 1/50 centimeters. Using the scanning pattern for the color yellow, where the gratest deviation will occur, we obtain an angular deviation of which the tangent is 1/2,500. This results in an angular deviation of 0.023 degrees, or less than 1 minute, 30 seconds.

It is seen that the invention achieves a method and apparatus for making color separations for printing especially. The invention may be employed to make negatives from which the printing plates are processed or it may be used with certain known techniques to make the plates directly. The invention achieves its ends without the use of actual screens but when the separations are made the same effects are apparent.

Modifications and variations of the present invention are possible in light of the above teachings. It is therefore, to be understood that within the scope of the appending claims, the invention may be practiced otherwise than as specifically described.

What is claimed and desired to be secured by Letters Patent of the United States is:

1. A method of synthesizing a set of effective screened color separation images from an original composed of at least two different colors through the use of optical scanning in which the original is carried on a cylindrical surface which is rotated while a scanning beam is caused to move in two directions over the cylinder surface carrying said original, one direction being substantially parallel with the axis of the cylinder and the other direction being substantially perpendicular to said axis, the scanning mechanism being arranged to produce scanning points for reproduction at locations along the path of movement in said perpendicular direction, each separation image being synthesized in a program of movements of said beam relative to said cylinder which scans a predetermined area comprising at most all of said original and there being as many programs as separation images, said method comprising the following steps:

A. Establishing a base line on said cylinder which is parallel to the cylinder axis, B. Scanning the surface of said cylinder in a first program of movements of said beam which program will include said area of said original image and which is composed of movements in said two directions, one being axial and unilateral and the other being substantially perpendicular to the axis and unilateral in such a manner that consecutive perpendicular lines of movement are traced by said beam which are spaced by a second spacing ($l_2$) equal distances apart along the length of the cylinder, each perpendicular line of movement being a full circle of said cylinder, C. sequentially generating discrete scanning point signals from scanning points spaced along the lengths of the consecutive perpendicular lines, said points having a certain first spacing ($l_1$) relative to one another and the first point of each perpendicular line which is defined by the beam after passing the base line to start scanning having a certain third spacing ($l_3$) above said base line, the resulting field of scanning points if developed in a plane from the surface of the cylinder being rectangular and including said area, the lower horizontal edge of said field being coincident with said base line and one of its end edges comprising a coordinate perpendicular to said base line, all of the scanning points occurring above the base line and forming two sets of parallel lines, each set being orthogonal relative to the other, one set being at an angle ($\alpha$) relative to said coordinate, there being a fourth spacing (a) between the lines of each set and said fourth spacing being equal for both sets, (i) the first, second and fourth spacings not necessarily being equal to one another but all distances of each respective spacing being the same for that particular spacing, (ii) the third spacing being not necessarily the same for each particular line and being related to the order of scanning occurrence of said line with respect to the adjacent lines, D. the program of movement being effected by driving said scanning mechanism in accordance with a certain trigonometrical relationship which takes the spacings and said angle into consideration to achieve said field of scanning points, E. producing a first separation image from the scanning point signals derived from said field which fall on said area of said original, each signal adapted to form a printing element and the printing elements being respectively coincident with the scanning points of said field which fall on said image whereby said image area is reproduced on said separation image, F. repeating steps A through E utilizing the identical base line and commencing the scanning at the identical point at which the first scanning program was commenced, but the second separation image differing from the first in that the angle relative to said perpendicular coordinate of the second field is a certain angle ($\alpha_2$) different from the first mentioned certain angle ($\alpha$) whereby there is a predetermined angular disposition of said one set of parallel lines of the one separation image relative to the corresponding set of parallel lines of said second separation image, G. the fourth spacing (a) of both fields being equal and the dimensions of the separation images having the same propertional dimensions as said fields, the corresponding field dimensions being equal, respectively.

2. A method according to claim 1 in which the movements of the beam for scanning each perpendicular line occur sequentially, the perpendicular movements being separated from one another by horizontal movements of distance ($l_2$) effected by movement at the end or beginning of the generation of the respective perpendicular lines.

3. The method according to claim 1 in which the movements of the beam for scanning each perpendicular line occur simultaneously such that said perpendicular lines are effectively helical.

4. The method according to claim 1 in which the said trigonometric relationship is expressed as follows:

A. $\tan \alpha = u/v$
with the conditions:
$0 \leq \alpha \leq 90°$
$u \geq 0$ and integer
$v \geq 0$ and integer
$|u-v|$ is minimum B. $l_1 = a\sqrt{u^2+v^2}$ C. $l_2 = \dfrac{a}{\sqrt{u^2+v^2}}$ D. $l_3 = \beta l_1$
with $\beta = \{m - \text{integer}(m)\}$
and $m = np/(u^2+v^2)$
and $p = su + tv$
and $t = (sv+1)/u$
with the conditions:
$p \geq 0$ and integer
$s \geq 0$ and integer
$t \geq 0$ and integer
$|s-t|$ is minimum
$0 \leq n \leq u^2+v^2$ and integer.

5. An apparatus for synthesizing a set of effective screened color separation images from an original image composed of at least two different colors through the use of optical scanning, comprising:

A. a cylindrical surface which is rotatable around its longitudinal axis and the original image being carried on the cylindrical surface;

B. drive means for rotating the cylindrical surface;

C. optical sensor means which are movable axially of the cylindrical surface adjacent the original image, the sensor means for producing density signals corresponding to the density of scanned areas of the cylindrical surface, the sensor means providing a scanning beam which is caused to move in two directions over the cylindrical surface, one direction being substantially parallel with the axis of the cylinder and the other direction being substantially perpendicular to said axis and circumferential of said cylindrical surface;

D. drive means for moving the sensor means axially of the cylindrical surface;

E. drive control means coupled to both of the drive means to provide a program of movements of said beam relative to said cylindrical surface which scans a predetermined area comprising at most all of said original image, there being as many programs as separation images, every program of movement being such that consecutive circumferential lines of movement are traced by said beam perpendicular to a baseline established on said cylindrical surface parallel to the cylinder axis, said circumferential lines are spaced by a second spacing ($l_2$) equal distances apart along the length of the cylinder, each circumferential line of movement being a full circle of said cylinder;

F. scanning control means for sequentially producing discrete scanning area signals to the sensor means, said area signals causing the sensor means to sense areas spaced along the lengths of the consecutive circumferential lines, said sensed areas having a certain first spacing ($l_1$) relative to one another and the first sensed area of each circumferential line which is sensed by the beam after the beam passes the baseline having a certain third spacing ($l_3$) relative to the baseline, the resulting field of scanned areas if developed in a plane from the surface of the cylinder being rectangular and including said original image, the lower horizontal edge of said field being coincident with said base line and one of its end edges comprising a coordinate perpendicular to said base line, all of the scanning points occurring above the base line and forming two sets of parallel lines, each set being orthogonal relative to the other, and each set being at a different angle ($\alpha$) relative to said coordinate, there being a fourth spacing (a) between the lines of each set and said fourth spacing being equal for all sets, i. the first, second and fourth spacing not necessarily being equal to one another but all distances of each respective spacing being the same for that particular spacing,
  ii. the third spacing being not necessarily the same for each particular line and being related to the order of scanning occurrence of said line with respect to the adjacent lines, G. the program of movements effected by the drive control means and the production of the area signals being determined by certain trigonometric relationships which take the spacing and said angle into consideration to achieve said fields of scanned areas:

H. means for producing separation images from the density signals derived from said field which fall on said area of said original, each signal adapted to form a printing element and the printing elements being respectively coincident with the scanned areas of said field which fall on said image whereby said image area is reproduced on said separation image, I. the fourth spacing (a) of all fields being equal and the dimensions of the separation images having the same proportional dimensions as said fields, the corresponding field dimensions being equal, respectively.

6. The apparatus according to claim 5 in which the movements of the beam for scanning each circumferential line occur sequentially, the perpendicular movements being separated from one another by horizontal movement of distance ($l_2$) effected by movement at the end or beginning of the generation of the respective circumferential lines.

7. The apparatus according to claim 5 in which the movements of the beam for scanning each circumferential line occur simultaneously such that said circumferential lines are effectively helical.

8. The apparatus according to claim 5 in which the said trigonometric relationships are expressed as follows:

A. $\tan \alpha = u/v$ with the conditions:

$0 \leq \alpha \leq 90°$
$u \geq 0$ and integer
$v \geq 0$ and integer
$|u-v|$ is minimum B. $l_1 = a\sqrt{u^2+v^2}$ C. $l_2 = \dfrac{a}{\sqrt{u^2+v^2}}$ D. $l_3 = \beta l_1$ with $\beta = \{m - \text{integer}(m)\}$
and $m = np/(u^2+v^2)$
and $p = su + tv$
and $t = (sv+1)/u$ with the conditions:

$p \geq 0$ and integer
$s \geq 0$ and integer
$t \geq 0$ and integer
$|s-t|$ is minimum
$0 \leq n \leq u^2+v^2$ and integer.

* * * * *

UNITED STATES PATENT AND TRADEMARK OFFICE
CERTIFICATE OF CORRECTION

PATENT NO. : 4,293,873

DATED : October 6, 1981

INVENTOR(S) : Barendregt, et al.

It is certified that error appears in the above-identified patent and that said Letters Patent are hereby corrected as shown below:

Column 4, line 27, change "magneta" to -- magenta --

Column 4, line 51, change "75" to -- 45 --

Column 10, line 1, change "Accordingly" to --According--.

Column 12, line 3, change "propertional" to --proportional--.

Signed and Sealed this

Seventh Day of December 1982

[SEAL]

Attest:

GERALD J. MOSSINGHOFF

*Attesting Officer*  *Commissioner of Patents and Trademarks*